A. B. Hartill,
Fishing Reel,
No. 56,937.  Patented Aug. 7, 1866.
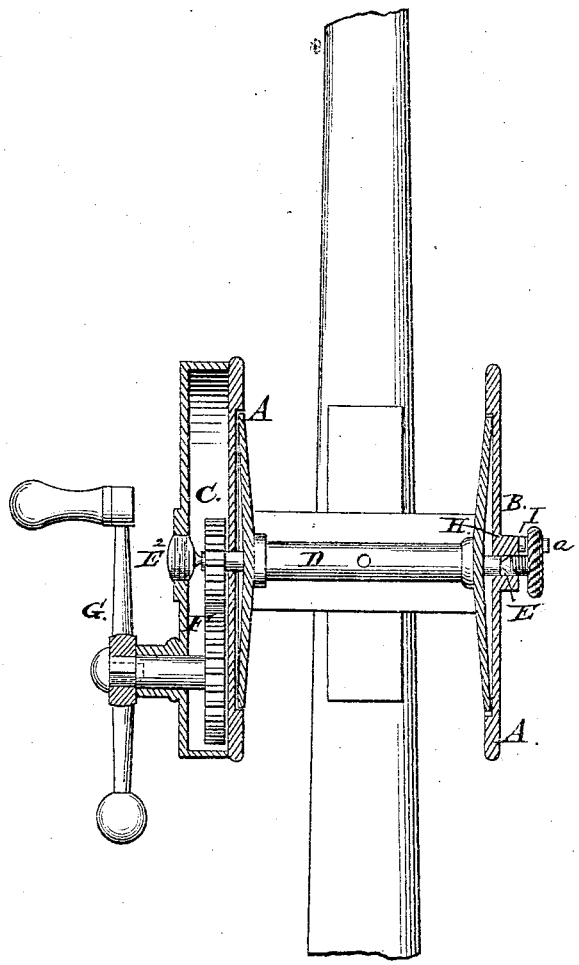
Witnesses:
Inventor:
A. B. Hartill

UNITED STATES PATENT OFFICE.

A. B. HARTILL, OF NEW YORK, N. Y.

IMPROVEMENT IN FISHING-LINE REELS.

Specification forming part of Letters Patent No. 56,937, dated August 7, 1866.

*To all whom it may concern:*

Be it known that I, A. B. HARTILL, of the city, county, and State of New York, have invented new and useful Improvements in Fishing-Line Reels; and I do hereby declare that the following is a full, clear, and exact description thereof, which will enable others skilled in the art to make and use the same, reference being had to the accompanying drawings, forming part of this specification.

The present invention consists in a novel manner of hanging the spool of the reel to its frame, and also in a novel and simple manner of producing the "drag," so called, upon the spool, to prevent the fish from running away with the line, as will be obvious from the following detail description of the reel, reference being had to the accompanying plate of drawing, in which the figure is a central section of a reel made according to the present invention.

A in the drawing represents the frame of the reel, which may be of any of the ordinary or other suitable constructions, in and to which, across from one end or head plate, B, to the other, C, a spool, D, is hung, upon steel or other suitable hardened center pins, E $E^2$, one to each end. One, $E^2$, of these steel centers is secured or fixed in one of the head-plates, C, of the reel-frame, in which plate or head a train of gears, F, is arranged, having suitably secured to one of them a handle, G, for convenience in turning and operating them, and thus revolving the other, while the other steel center, E, is formed at the end of a short screw spindle or shaft, H, that is screwed into the socket I of one end of the reel in proper position for the suspension or hanging of the spool upon it. This spindle H is provided with a milled head, J, upon its outer end, in which head is a set-screw, $a$, that, abutting against the fixed knob $b$ of the socket I, prevents the turning of the screw-spindle to such a degree out of the said socket as to relieve its steel point from the spool, while at the same time it can be turned sufficiently in the opposite direction to cause the spool to be tightly bound and held between its two points of suspension, and thus produce a "drag," so called, thereon, when so desired or deemed necessary, to prevent the fish from running away with the line.

By suspending the reel-spool upon steel centers its wear and durability are much increased, quite important desiderata.

I claim as new and desire to secure by Letters Patent—

The set-screw $a$, in combination with the fixed stud $b$ of the reel, substantially as and for the purpose specified.

A. B. HARTILL.

Witnesses:
WM. F. MCNAMARA,
ALBERT W. BROWN.